US009887784B1

(12) United States Patent
Tertinek

(10) Patent No.: US 9,887,784 B1
(45) Date of Patent: Feb. 6, 2018

(54) COMPENSATION OF A FREQUENCY DISTURBANCE IN A DIGITAL PHASE LOCK LOOP

(71) Applicant: INTEL CORPORATION, Santa Clara, CA (US)

(72) Inventor: Stefan Tertinek, Linz (AT)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/278,830

(22) Filed: Sep. 28, 2016

(51) Int. Cl.
H04B 1/40 (2015.01)
H04W 88/02 (2009.01)
H04B 17/10 (2015.01)
H04B 17/345 (2015.01)

(52) U.S. Cl.
CPC ............. H04B 17/101 (2015.01); H04B 1/40 (2013.01); H04B 17/345 (2015.01); H04W 88/02 (2013.01)

(58) Field of Classification Search
CPC ...... H04B 17/101; H04B 17/345; H04B 1/40; H04W 88/02
USPC ...................................................... 455/67.13
See application file for complete search history.

(56) References Cited

U.S. PATENT DOCUMENTS

| 8,838,046 | B2* | 9/2014 | Fu | ........................ H04B 1/406 455/67.13 |
| 2008/0192877 | A1* | 8/2008 | Eliezer | ................. H03L 7/1806 375/376 |
| 2008/0315928 | A1* | 12/2008 | Waheed | ................ G04F 10/005 327/159 |
| 2012/0256693 | A1* | 10/2012 | Raghunathan | ........ H03L 7/0805 331/34 |
| 2013/0308960 | A1* | 11/2013 | Horikoshi | .......... H03H 21/0012 398/209 |
| 2015/0105032 | A1* | 4/2015 | Wang | ................... H03K 17/161 455/77 |
| 2015/0334609 | A1* | 11/2015 | Waldhauser | ...... H04W 36/0061 455/436 |
| 2016/0127160 | A1* | 5/2016 | Muhammad | .......... H03L 7/1976 375/260 |
| 2016/0241301 | A1* | 8/2016 | Pavlovic | .............. H03C 3/0933 |
| 2016/0316488 | A1* | 10/2016 | Ko | ...................... H04W 76/048 |

* cited by examiner

Primary Examiner — Edward Urban
Assistant Examiner — Ralph H Justus
(74) Attorney, Agent, or Firm — Lowenstein Sandler LLP

(57) ABSTRACT

A user equipment (UE) to compensating for the frequency disturbance. The apparatus may include baseband circuitry and radio frequency (RF) circuitry. The baseband circuitry may detect a request for connectivity circuitry to perform an operation that generates a signal creating a frequency disturbance at the RF circuitry and send operation information indicating a type of the operation to radio frequency (RF) circuitry. The RF circuitry may include a processor and a phase lock loop (PLL) subsystem. The processor may receive the operation information; determine timing information correlating to the operation information; and send the timing information to a phase lock loop (PLL) subsystem indicating the type of the operation and a time of the operation. The PLL subsystem may generate an inverse signal to compensate for the frequency disturbance.

19 Claims, 6 Drawing Sheets

COMPENSATION OF A FREQUENCY DISTURBANCE IN A DIGITAL PHASE LOCK LOOP

BACKGROUND

The disclosure relates to the field of wireless communications, including compensation of frequency disturbances in a digital phase lock loop.

BRIEF DESCRIPTION OF THE DRAWINGS

Various exemplary implementations of the present disclosure will be understood more fully from the detailed description given below and from the accompanying drawings of various exemplary implementations of the disclosure.

DETAILED DESCRIPTION

Figure 1:
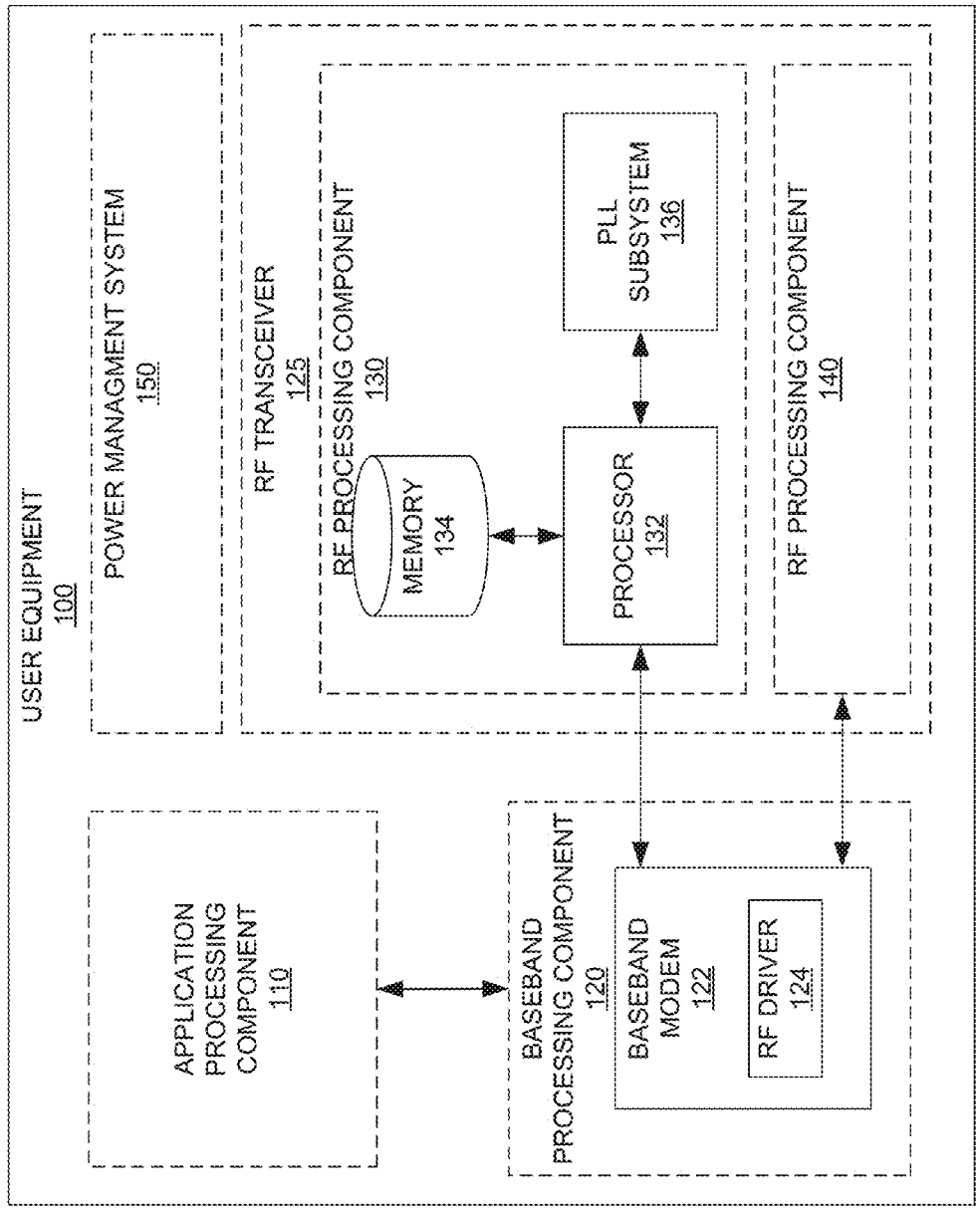
FIG. 1 illustrates a block diagram of a user equipment (UE) that includes application circuitry, baseband circuitry, radio frequency (RF) circuitry, a power management system, and RF circuitry according to one exemplary implementation

In the following description, various aspects of the illustrative exemplary implementations will be described using terms commonly employed by those skilled in the art to convey the substance of their work to others skilled in the art. However, it will be apparent to those skilled in the art that the present disclosure may be practiced with only some of the described aspects. For purposes of explanation, specific numbers, materials and configurations are set forth in order to provide a thorough understanding of the illustrative exemplary implementations. However, it will be apparent to one skilled in the art that the present disclosure may be practiced without the specific details. In other instances, well-known features are omitted or simplified in order not to obscure the illustrative exemplary implementations.

Wireless communication has become ubiquitous in modern society. Wireless radios may be designed to communicate via multiple communication technologies, including cellular technology, wireless fidelity (Wi-Fi) technology, global navigation satellite system (GNSS) technology, and so forth. To support communications using multiple communication technologies, wireless radios may include a radio frequency (RF) transceiver with multiple independent RF circuits or macros integrated together into the same system. To reduce a size and complexity of the wireless radio, the integrated RF circuits or macros may receive power from a common power source.

The common power source may provide power to multiple RF circuits at the same time. However, when a first RF circuitry or macro is currently transmitting or receiving a signal and a second RF circuitry or macro is turned on or initiates performance of a new operation, an increased amount of current may be drawn from a common power source. The increased current draw may cause a voltage fluctuation (also referred as a voltage transient) on the first RF circuitry or macro. For example, the first RF circuitry or macro may include a digital phase lock loop (PLL) with a digitally controlled oscillator (DCO) to generate an output signal that correlates to a phase of an input signal. The voltage fluctuation may influence a phase of the DCO, causing the output signal from the DCO to have phase noise. The DCO may be an oscillator circuitry that generates an analog signal with a frequency that is controlled by a digital control input.

A voltage fluctuation from the power supplied to the DCO may also disturb the DCO frequency and cause a resettling of the phase of a local oscillator signal coupled to the DCO. Since the second RF circuitry or macro may be turned on independent from the first RF circuitry or macro, the phase resettling may happen during transmission or reception of a signal at the first RF circuitry or macro. The phase resettling may lead to an increase in an error vector magnitude (EVM) indicating a decrease in an accuracy of a transmission or reception of a signal and throughput degradation.

Conventionally, to compensate for frequency disturbances caused by a voltage fluctuation, the PLL may include a low dropout regulator (LDO) with a relatively high power supply rejection ratio (PSRR) set to reject the power that is fluctuating beyond a threshold level. However, a high PSRR at the LDO may increase a size of the RF circuitry and a power consumption level of the RF circuit. Additionally, to compensate for the frequency disturbances, the PLL may include the digital loop filter (DLF) set to have a relatively fast resettling rate to enable the local oscillator signal to resettle within a relatively short period of time. However, the DLF set to have a relatively fast resettling rate may decrease a performance of the RF circuitry by increasing phase noise into a signal transmitted by the RF circuit. Additionally, the DLF set to have a relatively fast resettling rate may only reduce the local oscillator phase resettling rather than eliminating the local oscillator phase resettling.

The present disclosure addresses the above-mentioned and other deficiencies by a PLL subsystem identifying and compensating for frequency disturbances in PLLs to avoid phase resettling. To compensate for frequency disturbances at the DCO, the PLL subsystem applying another signal that is the inverse of the output signal from the DCO with the phase noise.

The parameters of the inverse signal can be stored in a memory. When a baseband circuitry of user equipment determines that the second RF circuitry or macro may receive a request to perform an operation that will cause a frequency disturbance at the first RF circuitry or macro, the PLL subsystem may then identify an inverse signal, stored in the memory, to compensate for the frequency disturbance. The PLL subsystem may apply the inverse signal at the DCO of the RF circuitry and compensate for the frequency disturbance and avoid local oscillator phase resettling.

FIG. 1 illustrates a block diagram of a user equipment (UE) 100 that includes application circuitry 110, baseband circuitry 120, radio frequency (RF) circuitry 130, an RF circuitry 140, and a power management system 150 according to one exemplary implementation. The UE 100 may be a smartphone, a tablet computer, a laptop computer, a personal data assistant (PDA), and so forth.

The application circuitry 110 may include one or more application processors. For example, the application circuitry 110 may include circuitry such as, but not limited to, one or more single core or multicore processors. The processor(s) may include any combination of general-purpose processors and dedicated processors (e.g., graphics processors, application processors, etc.). The processors may be coupled with and/or may include memory and may be configured to execute instructions stored in the memory to enable various applications and operating systems to run on the system.

The baseband circuitry 120 may include one or more processors and a baseband modem 122 which executes an RF driver 124. The RF driver 124 is dedicated firmware used for the time-accurate activation and control of RF systems within the UE, such as a cellular system (e.g. 2G/3G/4G) or a connectivity system. The connectivity system may be a global navigation satellite system (GNSS), a personal area network (PAN) system, a wide area network (WAN) system, or a wireless local area network (WLAN) system. Timing information is exchanged between the RF driver and the cellular system and/or the connectivity systems, in particular with a processor of one of the systems.

The processor(s) may process baseband signals received from a receive signal path of the RF circuitry 130 and generate baseband signals for a transmit signal path of the RF circuitry 130. The baseband circuitry 120 may interface with the application circuitry 110 for generation and processing of the baseband signals and for controlling operations of the RF circuitry 130. The baseband circuitry 120 may handle various radio control functions that enable communication with one or more radio networks via the RF circuitry 130.

The radio control functions may include, but are not limited to, signal modulation/demodulation, encoding/decoding, radio frequency shifting, etc. For example, the baseband circuitry 120 may provide data to RF circuitry 130 that provides information on throughput data 120 for uplink or downlink transmission of the UE.

In some exemplary implementations, the baseband circuitry 120 may provide for communication compatible with one or more radio technologies. For example, in some exemplary implementations, the baseband circuitry 120 may support communication with an evolved universal terrestrial radio access network (EUTRAN) and/or other wireless metropolitan area networks (WMAN), a wireless local area network (WLAN), a wireless personal area network (WPAN), or a GNSS network. Exemplary implementations in which the baseband circuitry 120 is configured to support radio communications of more than one wireless protocol may be referred to as multi-mode baseband circuitry.

The RF circuitry 130 and the RF circuitry 140 can include antennas to receive data. RF circuitry 130 and the RF circuitry 140 may enable communication with wireless networks using modulated electromagnetic radiation through a non-solid medium. In various exemplary implementations, the RF circuitry 130 and the RF circuitry 140 may include switches, filters, amplifiers, etc. to facilitate the communication with the cellular network. RF circuitry 130 and the RF circuitry 140 may include a receive signal path which may include circuitry to down-convert RF signals and provide baseband signals to the baseband circuitry 120. RF circuitry 130 may also include a transmit signal path which may include circuitry to up-convert baseband signals provided by the baseband circuitry 120 and provide RF output signals for transmission.

The RF circuitry 130 may include a processor 132, a memory 134, and a PLL subsystem 136. The processor 132 may control the PLL subsystem 136 and store data and information in the memory 134, such as timing information. The processor 132 may include one or more application processors. For example, the application processors may include circuitry such as, but not limited to, one or more single core or multicore processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system. The memory 134 may be coupled to the processor 132. In one example, the memory 134 may store instruction for the processor 132 to execute. In another example, the processor 132 may write data to the memory 134 or read data from the memory 134. The PLL subsystem 136 is described in greater detail below. In one exemplary implementation, the RF circuitry 140 may be GNSS. In another exemplary implementation, the RF circuitry 140 may be wireless fidelity (Wi-Fi) circuitry in accordance with IEEE 802.11 standards.

The RF circuitry 130 and the RF circuitry 140 may be integrated together on the same chip. For example, the RF circuitry 130 may include a cellular macro for the user equipment to use to communicate on a cellular network and the RF circuitry 140 may include a GNSS macro or a Wi-Fi macro to communicate on a wireless network or GNSS network.

The power management system 150 may control a distribution of power to the systems and circuitry of the user equipment 100. For example, the power management system 150 may include a direct-current-to-direct-current (DC/DC) converter that is a common power source to the RF circuitry 130 and the RF circuitry 140, as discussed in greater detail below.

In some exemplary implementations, the UE 100 may include additional elements such as, for example, memory/storage, display, camera, sensor, and/or input/output (I/O) interface.

Some or all of the components of the application circuitry 110, baseband circuitry 120, radio frequency (RF) circuitry 130, a power management system 150, and RF circuitry 140 may be suitably combined in a single chip, a single chipset, or disposed on a same circuit board in some exemplary implementations. In some exemplary implementations, some or all of the constituent components of the application circuitry 110, baseband circuitry 120, radio frequency (RF) circuitry 130, a power management system 150, and RF circuitry 140 may be implemented together such as, for example, on a system on a chip (SoC).

Figure 2:
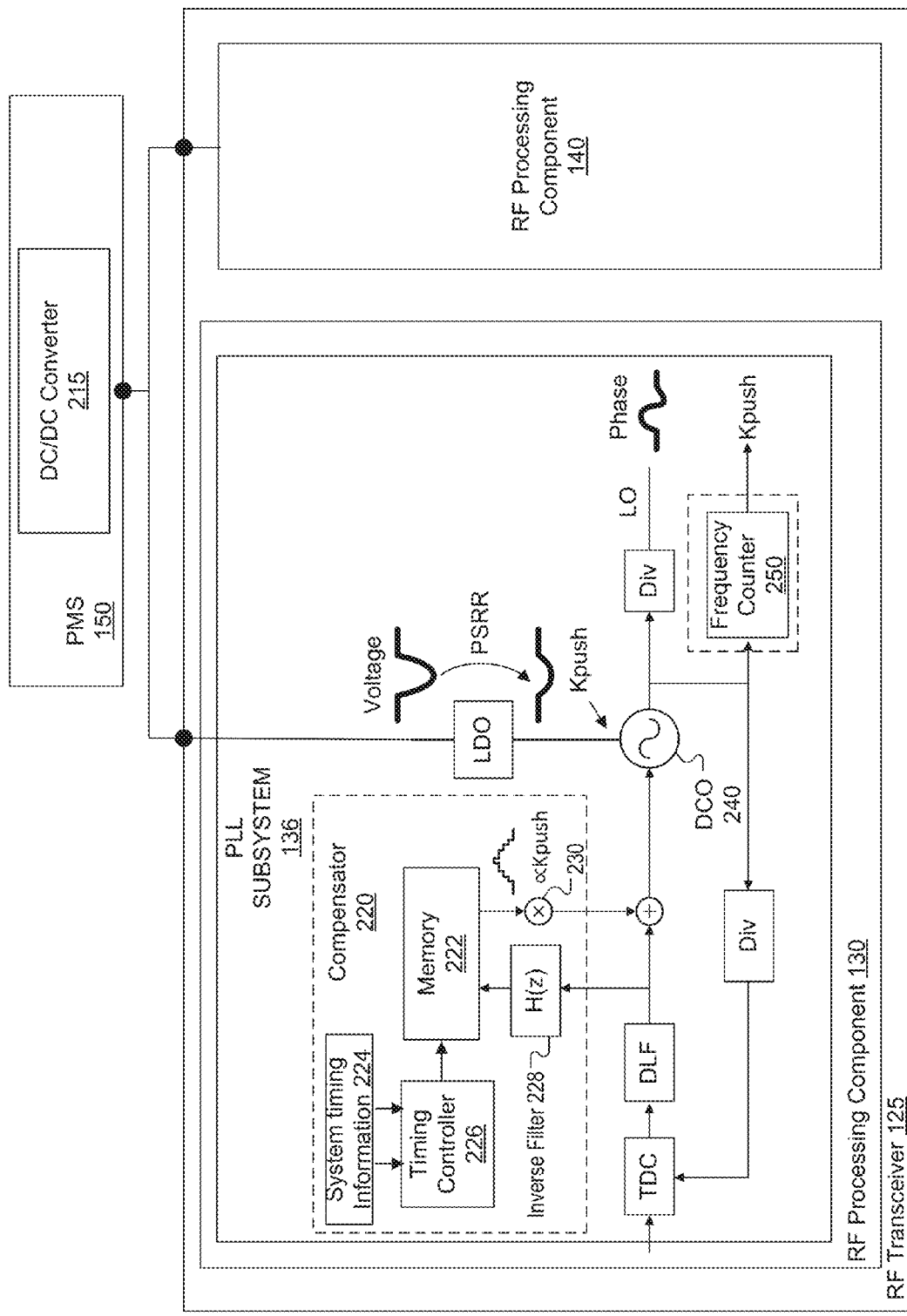
FIG. 2 illustrates a block diagram of the RF transceiver and the RF circuitry coupled to the power management system of FIG. 1 according to one exemplary implementation.

FIG. 2 illustrates a block diagram of the RF transceiver 125 and the RF circuitry 140 coupled to the power management system 150 of FIG. 1 according to one exemplary implementation. Some of the features in FIG. 2 are the same or similar to the some of the features in FIG. 1 as noted by same reference numbers, unless expressly described otherwise. The RF transceiver 125 may include the RF circuitry 130 and the RF circuitry 140 according to one exemplary implementation.

The RF circuitry 130 and the RF circuitry 140 may be coupled to a common power supply, such as a direct-current-to-direct-current (DC/DC) converter 215. The RF circuitry 130 and the RF circuitry 140 may use the power provided by the DC/DC converter 215 to send or received data over a communication channel with another device. The RF circuitry 130 and the RF circuitry 140 may operate independent of each other. For example, the RF circuitry 130 may receive a first signal for transmitting from the baseband modem 122 of FIG. 1 and the RF circuitry 140 may receive a second signal for transmitting from the baseband modem 122. In one exemplary implementation, the RF circuitry 130 may transmit the first signal in parallel with the RF circuitry 140 transmitting the second signal.

When the RF circuitry 140 initiates a first operation while the RF circuitry 130 is performing a second operation, the initiation of the first operation by the RF circuitry 140 may cause a frequency disturbance at the RF circuitry 130. In one example, the frequency disturbance may be transient or temporary, as it may occur at a time surrounding the initiation of the first operation The PLL subsystem 136 may compensate for the frequency disturbance to avoid an interruption in an operation of the RF circuitry 130. For example, the RF circuitry 130 may be transmitting a first signal via an antenna to another device when the RF circuitry 140 initiates an operation to receive a second signal to determine a location of the user equipment 100. The RF circuitry 140 initiating the operation may pull down an amount of power provided to the RF circuitry 130 by the DC/DC converter 215. The pulling down of power can create a frequency disturbance at a DCO 240 of the RF circuitry 130. To compensate for the frequency disturbance, the RF circuitry 130 may use the PLL subsystem 136. The PLL subsystem 136 may include a compensator 220, the DCO 240, and a frequency counter 250.

To compensate for the frequency disturbance, the baseband circuitry 120 may determine that the baseband modem 122 sent a request to the RF circuitry 140 to perform an operation. In response to the baseband modem 122 sending the request, the baseband circuitry 120 may send operation information to the processor 132 indicating the type of request the baseband modem 122 sent to the RF circuitry 140. The processor 132 may determine timing information correlating to the type of request indicated by the operation information. The timing information may indicate when the frequency disturbance may occur in view of the baseband modem 122 sending the request. For example, the memory 134 may store a look-up table with a first set of entries correlating to different types of requests and a second set of entries indicating an amount of time from the baseband modem 122 sending the request until the frequency disturbance may occur. The processor 132 may send the timing information 224 to the timing controller 226 in the PLL subsystem 136. In one example, the timing controller may be a finite state machine (FSM). The timing information 224 may indicate a type of frequency disturbance and a time when the frequency disturbance may occur. The timing controller 226 may identify a digital representation of an inverse disturbance signal that correlates to the type of frequency disturbance and indicates when the disturbance is expected at the DCO 240, such as when the connectivity circuitry is switched on. In one example, the timing controller 226 may query a lookup table storing different digital representations correlating to different types of operations. The digital representations of the inverse signal may include information indicating an amplitude of the inverse signal, a shape of the inverse signal, and an amount of time to apply the inverse signal.

The timing controller 226 may generate an inverse signal of the disturbance signal and send the inverse signal to the DCO 240 at the time the timing information 224 indicates the frequency disturbance will occur. In response to receiving the inverse signal, the DCO 240 may apply the inverse signal to compensate for the frequency disturbance caused by the connectivity circuitry performing the operation. In one exemplary implementation, the timing controller 226 may generate an inverse signal by sequentially reading content in the memory and generating a signal from the sequential content. The inverse that is applied at a tuning input of the DCO 240 to compensate for the frequency disturbance. In another exemplary implementation, the timing controller 226 may generate an inverse signal using a digital logic, such as a counter for a triangular transient signal. In another exemplary implementation, the DCO 240 may include a digitally controlled varactor bank for fine tuning a frequency of the signal. In another exemplary implementation, the DCO 240 may be driven by a control signal from the DC/DC converter 215.

In one exemplary implementation, the inverse signal may be further scaled to account for a pushing factor Kpush ($=\Delta fdco/\Delta Vdd$) which converts the voltage disturbance into a frequency disturbance. The timing controller 226 may determine the pushing factor by sweeping a voltage ($\Delta Vdd$) at a low-dropout (LDO) regulator that regulates a voltage level of the power received from the DC/DC converter 215. The timing controller 226 may measure a change in the DCO frequency ($\Delta fdco$) using a frequency counter. In one example, the timing controller 226 may scale the inverse signal by a gain proportional to the pushing factor ($\alpha Kpush$) and apply the scaled inverse signal at the fine-tuning (FT) input of the DCO. The FT input of the DCO may comprise a digitally controlled varactor bank used for fine tuning the frequency at the DCO 240. The gain may be implemented as a digital multiplier.

Figure 3:
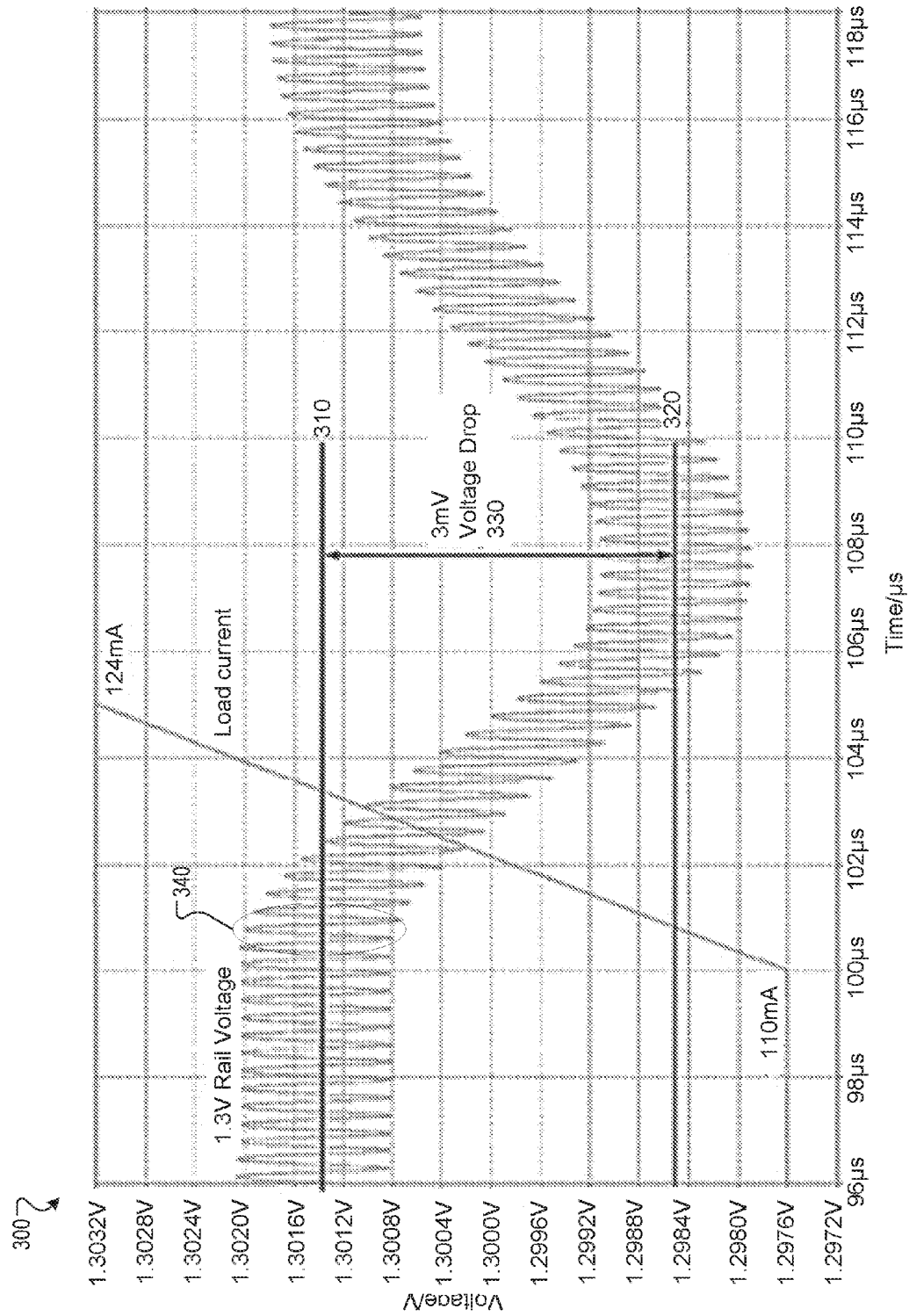
FIG. 3 illustrates a graph of voltage drop at the DCO according to one exemplary implementation.

FIG. 3 illustrates a graph 300 of voltage drop 330 at the DCO 240 according to one exemplary implementation. Some of the features in FIG. 3 are the same or similar to some of the features in FIGS. 1 and 2 as noted by same reference numbers, unless expressly described otherwise. When the RF circuitry 130 of FIG. 2 is performing a first operation, such as sending or receiving data, the RF circuitry 130 may receive power from the DC/DC converter 215 at a first voltage level 310, such as 1.3 volts. The RF circuitry 140 may receive a request to perform a second operation at a point in time 340 while the RF circuitry 130 continues to perform the first operation. When the RF circuitry 140 begins performing the second operation at the point in time 340, a large load current (such as 14 milliamps) is drawn from the DC/DC converter 215 of the power management system (PMS) 150. The increased current draw may cause the voltage available to the RF circuitry 130 to drop to a second voltage level 320, such as 1.297V. The voltage drop 330 may cause a voltage transient at the RF circuitry 130. The voltage transient may influence the DCO 240 and create a disturbance in a frequency used by the RF circuitry 130 to send or receive the data.

Figure 4:
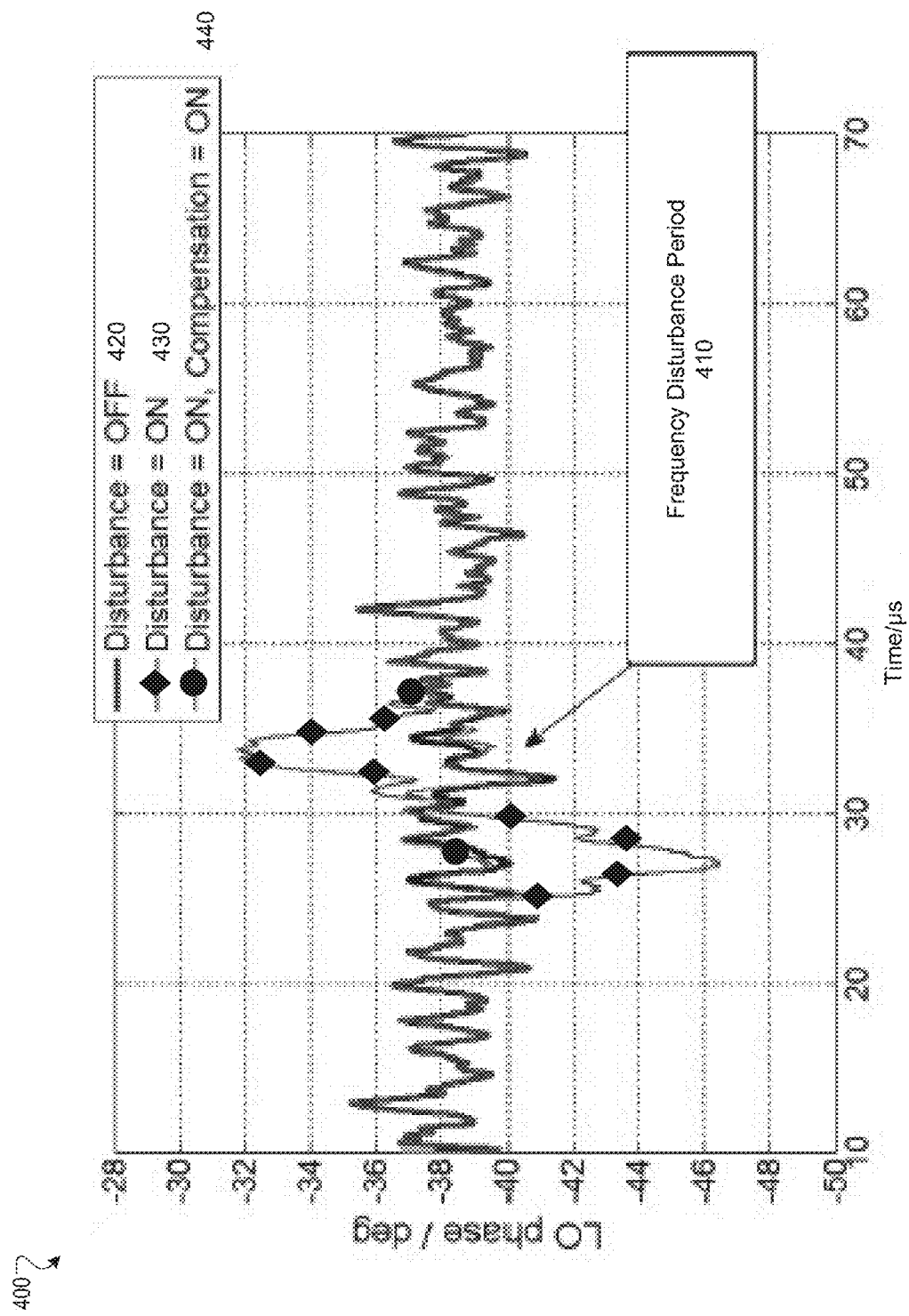
FIG. 4 illustrates a graph of a frequency disturbance period according to one exemplary implementation.

FIG. 4 illustrates a graph 400 of a frequency disturbance period 410 according to one exemplary implementation. When the RF circuitry 130 of FIG. 2 is not transmitting a signal, a local oscillator phase may include a relatively small amount of random noise from components in the RF circuitry without any frequency disturbances. When a disturbance occurs, the local oscillator phase may be a first waveform 420 that is within a first phase range, such as approximately −36 to −42 degrees. When the disturbance occurs without any compensation, a deterministic phase component is added on top of the random phase component, causing a phase to deviate towards a positive or negative value, as shown by waveform 430. When the disturbance occurs and is compensated for by the PLL subsystem, the deterministic phase component is cancelled out, as shown by waveform 440. The first waveform 420 and the third waveform 440 may be similar waveforms with similar phases.

Figure 5:
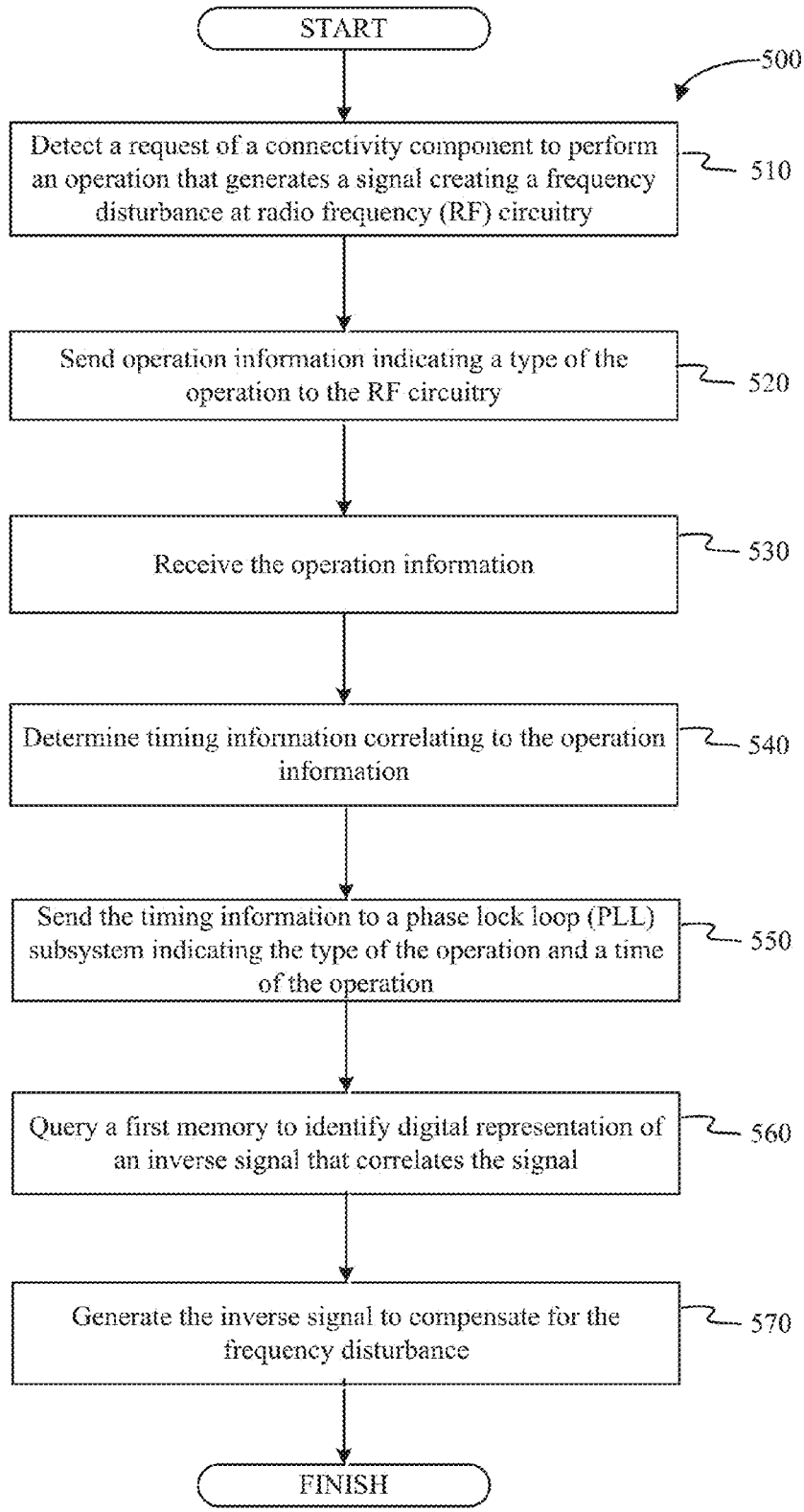
FIG. 5 illustrates a method of compensating for a frequency disturbance by applying an inverse signal at an RF circuitry according to one exemplary implementation.

FIG. 5 illustrates a method 500 of compensating for a frequency disturbance by applying an inverse signal at an RF circuitry according to one exemplary implementation. The method 500 may at least partially be performed by processing logic that includes hardware (e.g., circuitry, dedicated logic, processing component, microcode, etc.), software (e.g., instructions executed by a processing device), firmware or a combination thereof. In one exemplary implementation, the method 500 may be performed by all or part of the UE 100 of FIG. 1. For example, the method 500 may be performed by the baseband circuitry 120 or the RF circuitry 130.

Referring to FIG. 5, the method 500 begins at block 510 with a baseband circuitry detecting a request of a connectivity component to perform an operation that generates a signal creating a frequency disturbance at radio frequency (RF) circuitry. At block 520, the baseband circuitry may send operation information indicating a type of the operation to the RF circuitry. At block 530, a processor in RF circuitry may receive the operation information. At block 540, the processor may determine timing information correlating to the operation information. At block 550, the processor may send the timing information to a phase lock loop (PLL) subsystem indicating the type of the operation and a time of the operation. At block 560, the PLL subsystem may query a first memory to identify digital representation of an inverse signal that correlates the signal. At block 570, the PLL subsystem may generate the inverse signal to compensate for the frequency disturbance.

Figure 6:
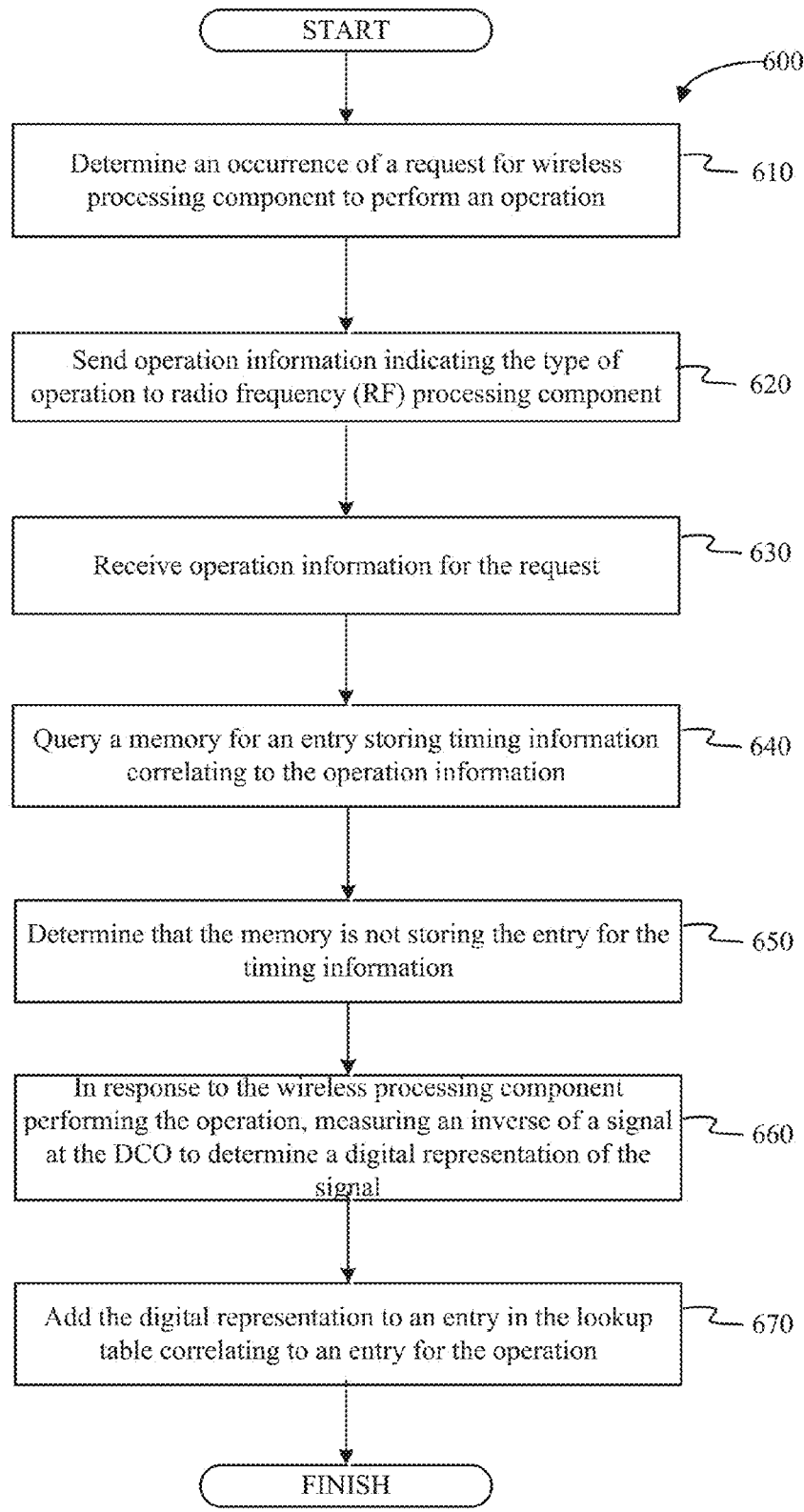
FIG. 6 illustrates a method of generating a look-up table of inverse signals to compensate for frequency disturbances according to one exemplary implementation.

FIG. 6 illustrates a method 600 of generating a look-up table of inverse signals to compensate for frequency disturbances according to one exemplary implementation. The method 600 may at least partially be performed by processing logic that includes hardware (e.g., circuitry, dedicated logic, processing component, microcode, etc.), software (e.g., instructions executed by a processing device), firmware or a combination thereof. In one exemplary implementation, the method 600 may be performed by all or part of the UE 100 of FIG. 1. For example, the method 600 may be performed by the baseband circuitry 120 or the RF circuitry 130.

Referring to FIG. 6, the method 600 begins at block 610 with a baseband circuitry determine an occurrence of a request being sent to connectivity circuitry to perform an operation. At block 620, the baseband circuitry may send operation information indicating the type of operation to radio frequency (RF) circuitry, where the connectivity circuitry performing the operation generates a signal that causes a frequency disturbance at the RF circuitry. At block 630, a processor in RF circuitry may receive operation information for the request. At block 640, the processor may query a memory for an entry storing timing information correlating to the operation information. At block 650, the processor may determine that the memory is not storing the entry for the timing information.

At block 660, a PLL subsystem of the RF circuitry may, in response to the connectivity circuitry performing the operation, measure an inverse of a signal at the DCO to determine a digital representation of the signal. In one exemplary implementation, the PLL subsystem may include an inverse filter to generate the inverse signal for a processing device of the PLL subsystem to measure the inverse of the signal. At block 670, the PLL subsystem may add the digital representation to an entry in the lookup table correlating to an entry for the operation. In one exemplary implementation, the PLL subsystem is to scale the inverse signal by a gain proportional to a pushing factor. The processor may determine the pushing factor by sweeping a voltage at a low-dropout regulator that regulates a voltage level of the power received at the PLL subsystem.

To determine an inverse signal, a processor or the timing machine of the PLL subsystem may determine a DCO pushing factor Kpush and a function G(z) as a z-domain closed-loop transfer function (TF) from the DCO to the digital loop filter (DLF) output. The TF may be known, since it is determined by the TF of loop components which are also known and available digitally (calibrated TDC gain, TF of the DLF, etc.).

The pushing factor may be represented by the following equation: Kpush ($=\Delta fdco/\Delta Vdd$). To determine the pushing factor, a processor or timing controller 226 of FIG. 2 may set supply voltage of a DCO to a value Vdco1. The processor or timing controller 226 may measure the DCO frequency fdco1 using the frequency counter 250 of FIG. 2. The processor or timing controller 226 may set the DCO supply voltage to a value Vdco2. The processor or timing controller 226 may measure the DCO frequency fdco2 using the frequency counter 250. The processor or timing controller 226 may compute Kpush=$\Delta fdco/\Delta Vdco$=(fdco1−fdco2)/(Vdco1−Vdco2) given in a hertz to voltage ratio (Hz/V). The voltages Vdco1 and Vdco2 may be set by an LDO, with an mV range. In one example Vdco1 and Vdco2 may be predetermined values. The processor or timing controller 226 may filter a voltage transient on the DCO supply (green) by Kpush*G(z) and produce a response at the DLF output. The processor or timing controller 226 select an inverse filter H(z) to be H(z)=1/(Kpush*G(z)). The processor or timing controller 226 may combine TF H(z)*Kpush*G(z) (which may be a value of 1) and recover the voltage transient at an output of the inverse filter. The inverse of the transient is stored in the memory and used as the inverse signal.

A frequency disturbance will cause a response at a DLF output. An estimate of the disturbance is obtained by filtering the DLF output with an inverse filter whose transfer function H(z) equals the inverse of the transfer function from the DCO supply to the DLF output, including the pushing factor Kpush. The estimated disturbance can then be stored in the memory for the actual compensation, as described above.

While the present disclosure describes a number of exemplary implementations, those skilled in the art will appreciate numerous modifications and variations therefrom. It is intended that the appended claims cover all such modifications and variations as fall within the true spirit and scope of this present disclosure.

The following examples pertain to further embodiments.

Example 1 is an apparatus including: 1) baseband circuitry to: a) detect a request of a connectivity circuitry to perform an operation that generates a signal creating a frequency disturbance at radio frequency (RF)circuitry; and b) send operation information indicating a type of the operation to the RF circuitry; and 2) the RF circuitry coupled to the baseband circuitry, the RF circuitry including: a) a processor to: i) receive the operation information; ii) determine timing information correlating to the operation information; and iii) send the timing information to a phase lock loop (PLL) subsystem indicating the type of the operation and a time of the operation; and b) the PLL subsystem coupled to the processor, where the PLL subsystem is to: i) subsystem coupled to the processor to generate an inverse signal to compensate for the frequency disturbance.

In Example 2, the apparatus of Example 1, further including a direct current to direct current (DC/DC) converter to generate common power for the connectivity circuitry and the RF circuitry.

In Example 3, the apparatus of any one of Examples 1-2, wherein the PLL subsystem includes: 1) a compensator including: a) a timing controller to: i) receive the timing information from the processor; ii) query a memory to identify digital representation of an inverse signal that correlates the signal; iii) determine when the frequency disturbance occurs; and iv) generate the inverse signal to compensate for the frequency disturbance; 2) digitally controlled oscillator (DCO) to generate an output signal for the RF circuitry to transmit or receive by an antenna, where the DCO is supplied by the common power from the DC/DC converter.

In Example 4, the apparatus of any one of Examples 1-3, where the DCO comprises a digitally controlled varactor bank for fine tuning a frequency of the output signal.

In Example 5, the apparatus of any one of Examples 1-4, where the memory comprises a lookup table to store digital representation of the inverse signal correlating to the operation, and where the digital representation comprises an amplitude of the inverse signal, a shape of the inverse signal, and a duration of time to apply the inverse signal.

In Example 6, the apparatus of any one of Examples 1-5, where the processor is further to query the memory to identify timing information correlating to the type of the operation.

In Example 7, the apparatus of any one of Examples 1-6, where the PLL subsystem is further to scale a size or shape of the inverse signal to the size or shape of the signal.

In Example 8, the apparatus of any one of Examples 1-7, where the PLL subsystem further comprises an inverse filter to generate the inverse signal for a processing device of the PLL subsystem to measure an inverse of the signal.

In Example 9, the apparatus of any one of Examples 1-8, where the connectivity circuitry is for a global navigation satellite system (GNSS), a personal area network (PAN) system, a wide area network (WAN), or a wireless local area network (WLAN) and the RF circuitry is circuitry for a cellular system.

In Example 10, the apparatus of any one of Examples 1-9, where the connectivity circuitry and the RF circuitry are integrated on a single chip.

Various embodiments can have different combinations of the structural features described above. For instance, all optional features of the computing system described above can also be implemented with respect to the method or process described herein and specifics in the examples can be used anywhere in one or more embodiments.

Example 11 is an apparatus including: 1) baseband circuitry to: a) detect a request for connectivity circuitry to perform an operation that generates a signal creating a frequency disturbance at radio frequency (RF) circuitry; and b) send operation information indicating a type of the operation to the RF circuitry; 2) the RF circuitry coupled to the baseband circuitry, the RF circuitry including: a) a processor to: i) receive operation information for the request; ii) query a memory for a first entry storing timing information correlating to the operation information; and b) a phase lock loop (PLL) subsystem coupled to the processor, the PLL subsystem to: i) in response to the connectivity circuitry performing the operation and the processor determining that no first entry storing timing information is present in the memory, measure an inverse of the signal at a digitally controlled oscillator (DCO) to determine a digital representation of an inverse signal; and ii) add the digital representation to a second entry in a lookup table correlating to a third entry for the operation.

In Example 12, the apparatus of Example 11, where the PLL subsystem includes an inverse filter to generate the inverse signal for a processing device of the PLL subsystem to measure the inverse of the signal.

In Example 13, the apparatus of any one of Examples 11-12, where the PLL subsystem is to scale the inverse signal by a gain proportional to a pushing factor.

In Example 14, the apparatus of any one of Examples 11-13, where the processor is further to determine the pushing factor by sweeping a voltage at a low-dropout regulator that regulates a voltage level of power received at the PLL subsystem.

In Example 15, the apparatus of any one of Examples 11-14, where the digital representation comprises an amplitude of the inverse signal, a shape of the inverse signal, and an amount of time to apply the inverse signal.

Various embodiments can have different combinations of the structural features described above. For instance, all optional features of the computing system described above can also be implemented with respect to the method or process described herein and specifics in the examples can be used anywhere in one or more embodiments.

Example 16 is an apparatus including: 1) baseband circuitry to detect a request of a connectivity circuitry to perform an operation that generates a signal creating a frequency disturbance at radio frequency (RF) circuitry and send operation information indicating a type of the operation to the RF circuitry; 2) the RF circuitry coupled to the baseband circuitry, the RF circuitry including: a) a processor to: i) receiving the operation information; determine timing information correlating to the operation information; and ii) send the timing information to a phase lock loop (PLL) subsystem indicating the type of the operation and a time of the operation; b) a means for compensating for the frequency disturbance.

In Example 17, the apparatus of Example 16, further including a direct current to direct current (DC/DC) converter to provide common power to the connectivity circuitry and the RF circuitry.

In Example 18, the apparatus of any one of Examples 16-17, further including a direct current to direct current (DC/DC) converter to provide common power to the connectivity circuitry and the RF circuitry.

In Example 19, the apparatus of any one of Examples 16-18, where the connectivity circuitry and the RF circuitry are integrated on a single chip.

In Example 20, the apparatus of any one of Examples 16-19, where the connectivity circuitry is for a global navigation satellite system (GNSS), a personal area network (PAN) system, a wide area network (WAN) system, or a wireless local area network (WLAN) system and the RF circuitry is circuitry for a cellular communication system.

Various embodiments may have different combinations of the structural features described above. For instance, all optional features of the computing system described above may also be implemented with respect to the method or process described herein and specifics in the examples may be used anywhere in one or more embodiments.

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

In the description herein, numerous specific details are set forth, such as examples of specific types of processors and system configurations, specific hardware structures, specific architectural and microarchitectural details, specific register configurations, specific instruction types, specific system components, specific measurements/heights, specific processor pipeline stages and operation etc. in order to provide a thorough understanding of the present disclosure. It will be apparent, however, that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler exemplary implementations, specific expression of algorithms in code, specific power down and gating techniques/logic and other specific operational details of computer system have not been described in detail in order to avoid unnecessarily obscuring the present disclosure.

Instructions used to program logic to perform exemplary implementations of the disclosure can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A module as used herein refers to any combination of hardware, software, and/or firmware. As an example, a module includes hardware, such as a microcontroller, associated with a non-transitory medium to store code adapted to be executed by the micro-controller. Therefore, a reference to a module, in one exemplary implementation, refers to the hardware, which is specifically configured to recognize and/or execute the code to be held in a non-transitory medium. Furthermore, in another exemplary implementation, use of a module refers to the non-transitory medium including the code, which is specifically adapted to be executed by the microcontroller to perform predetermined operations. And as can be inferred, in yet another exemplary implementation, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one exemplary implementation, use of the term logic includes hardware, such as transistors, registers, or other hardware, such as processing component devices.

Use of the phrase 'configured to,' in one exemplary implementation, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focuses on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one exemplary implementation, refers to some apparatus, logic, hardware, and/or element designed in such a way to enable use of the apparatus, logic, hardware, and/or element in a specified manner. Note as above that use of to, capable to, or operable to, in one exemplary implementation, refers to the latent state of an apparatus, logic, hardware, and/or element, where the apparatus, logic, hardware, and/or element is not operating but is designed in such a manner to enable use of an apparatus in a specified manner.

The exemplary implementations of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information therefrom.

Instructions used to program logic to perform exemplary implementations of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one exemplary implementation" or "an exemplary implementation" means that a particular feature, structure, or characteristic described in connection with the exemplary implementation is included in at least one exemplary implementation of the present disclosure. Thus, the appearances of the phrases "in one exemplary implementation" or "in an exemplary implementation" on "in some exemplary implementations" in various places throughout this specification are not necessarily all referring to the same exemplary implementation. Furthermore, the particular features, structures, or characteristics may be combined in any suitable manner in one or more exemplary implementations.

In the foregoing specification, a detailed description has been given with reference to specific exemplary implementations. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of exemplary implementation and other exemplary language does not necessarily refer to the same exemplary implementation or the same example, but may refer to different and distinct exemplary implementations, as well as potentially the same exemplary implementation.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "selecting," "receiving," "determining," "generating," "optimizing," "associating," "obtaining," "identifying," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an exemplary implementation" or "one exemplary implementation" or "an exemplary implementation" or "one exemplary implementation" throughout is not intended to mean the same exemplary implementation or exemplary implementation unless described as such. Also, the terms "first," "second," "third," "fourth," etc. as used herein are meant as labels to distinguish among different elements and may not necessarily have an ordinal meaning according to their numerical designation.

What is claimed is:

1. An apparatus comprising:
baseband circuitry configured to:
    detect a request of a connectivity circuitry configured to perform an operation that generates a signal creating a frequency disturbance at radio frequency (RF) circuitry; and
    send operation information indicating a type of the operation to the RF circuitry; and
the RF circuitry coupled to the baseband circuitry, the RF circuitry comprising:
    a processor configured to: receive the operation information; determine timing information correlating to the operation information; and send the timing information to a phase lock loop (PLL) subsystem indicating the type of the operation and a time of the operation; and
    the PLL subsystem coupled to the processor, the PLL subsystem comprising a digitally controlled oscillator (DCO) to generate an output signal for the RF circuitry to transmit or receive by an antenna, wherein the DCO is supplied by common power from a direct current to direct current (DC/DC) converter, and wherein the PLL subsystem is configured to generate an inverse signal to compensate for the frequency disturbance.

2. The apparatus of claim 1, further comprising the DC/DC converter configured to generate the common power for the connectivity circuitry and the RF circuitry.

3. The apparatus of claim 2, wherein the PLL subsystem comprises
a timing controller configured to:
    receive the timing information from the processor;
    query a memory to identify digital representation of the inverse signal that correlates the signal;
    determine when the frequency disturbance occurs; and
    generate the inverse signal to compensate for the frequency disturbance.

4. The apparatus of claim 3, wherein the DCO comprises a digitally controlled varactor bank for fine tuning a frequency of the output signal.

5. The apparatus of claim 3, wherein the memory comprises a lookup table configured to store digital representation of the inverse signal correlating to the operation, and wherein the digital representation comprises an amplitude of the inverse signal, a shape of the inverse signal, and an duration of time to apply the inverse signal.

6. The apparatus of claim 3, wherein the processor is further configured to query the memory to identify timing information correlating to the type of the operation.

7. The apparatus of claim 1, wherein the PLL subsystem is further configured to scale a size or shape of the inverse signal to the size or shape of the signal.

8. The apparatus of claim 1, wherein the PLL subsystem further comprises an inverse filter configured to generate the inverse signal for a processing device of the PLL subsystem to measure an inverse of the signal.

9. The apparatus of claim 1, wherein the connectivity circuitry is for a global navigation satellite system (GNSS), a personal area network (RAN) system, a wide area network (WAN), or a wireless local area network (WLAN) and the RF circuitry is circuitry for a cellular system.

10. The apparatus of claim 1, wherein the connectivity circuitry and the RF circuitry are integrated on a single chip.

11. An apparatus comprising:
baseband circuitry configured to:
  detect a request for connectivity circuitry to perform an operation that generates a signal creating a frequency disturbance at radio frequency (RF) circuitry; and
  send operation information indicating a type of the operation to the RF circuitry; and
the RF circuitry coupled to the baseband circuitry, the RF circuitry comprising:
  a processor configured to:
    receive operation information for the request; and
    query a memory for a first entry storing timing information correlating to the operation information; and
  a phase lock loop (PLL) subsystem coupled to the processor, the PLL subsystem configured to:
    in response to the connectivity circuitry performing the operation and the processor determining that no first entry storing timing information is present in the memory, measure an inverse of the signal at a digitally controlled oscillator (DCO) to determine a digital representation of an inverse signal; and
    add the digital representation to a second entry in a lookup table correlating to a third entry for the operation.

12. The apparatus of claim 11, wherein the PLL subsystem comprises an inverse filter configured to generate the inverse signal for a processing device of the PLL subsystem to measure the inverse of the signal.

13. The apparatus of claim 12, wherein the PLL subsystem is configured to scale the inverse signal by a gain proportional to a pushing factor.

14. The apparatus of claim 13, wherein the processor is further configured to determine the pushing factor by sweeping a voltage at a low-dropout regulator that regulates a voltage level of power received at the PLL subsystem.

15. The apparatus of claim 12, wherein the digital representation comprises an amplitude of the inverse signal, a shape of the inverse signal, and an amount of time to apply the inverse signal.

16. An apparatus comprising:
baseband circuitry configured to detect a request of a connectivity circuitry to perform an operation that generates a signal creating a frequency disturbance at radio frequency (RF) circuitry and send operation information indicating a type of the operation to the RF circuitry; and
the RF circuitry coupled to the baseband circuitry, the RF circuitry comprising:
  a processor configured to: receiving the operation information; determine timing information correlating to the operation information; and send the timing information to a phase lock loop (PLL) subsystem indicating the type of the operation and a time of the operation; and a means for compensating for the frequency disturbance; and
  the PLL subsystem coupled to the processor, the PLL subsystem comprising a digitally controlled oscillator (DCO) to generate an output signal for the RF circuitry to transmit or receive by an antenna, wherein the DCO is supplied by common power from a direct current to direct current (DC/DC) converter.

17. The apparatus of claim 16, further comprising DC/DC converter configured to provide common power to the connectivity circuitry and the RF circuitry.

18. The apparatus of claim 16, wherein the connectivity circuitry and the RF circuitry are integrated on a single chip.

19. The apparatus of claim 16, wherein the connectivity circuitry is for a global navigation satellite system (GNSS), a personal area network (PAN) system, a wide area network (WAN) system, or a wireless local area network (WLAN) system and the RF circuitry is circuitry for a cellular communication system.

* * * * *